: 3,504,061
Patented Mar. 31, 1970

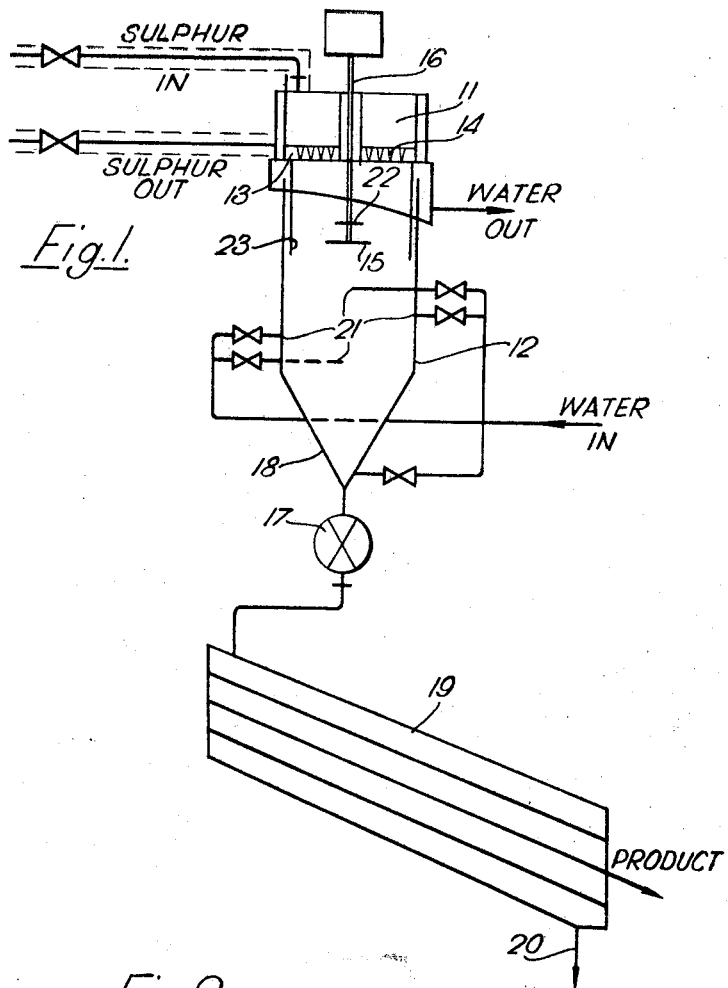

3,504,061
METHOD OF PREPARING SULPHUR PELLETS
Herbert James Elliott, Bradford-on-Avon, England, assignor to Elliott Associated Developments Limited, London, England, a corporation of the United Kingdom
Continuation of application Ser. No. 488,039, Sept. 17, 1965. This application Nov. 18, 1968, Ser. No. 776,830
Int. Cl. B22d 23/08; B29c 23/00
U.S. Cl. 264—9                                         9 Claims

ABSTRACT OF THE DISCLOSURE

A method for making sulphur pellets by delivering molten sulphur into a body of water which is agitated, and which may also contain a surface-active polymeric agent to prevent the resulting globules of sulphur from reuniting before cooling sufficiently to prevent mutual adhesion. The molten sulphur can be introduced into the water by streams entering a free-air space separated from the water surface, preferably from above. The pellets resulting have hard rounded surfaces and contain less than 1% locked-in moisture.

---

This case by the same inventor is a continuation of U.S. Ser. No. 488,039 filed Sept. 17, 1965, and now abandoned.

This invention relates to the treatment of sulphur and like normally solid materials that melt at fairly low temperatures. More particularly, it is concerned with the production of sulphur pellets that can be handled much more readily and conveniently than molten or block sulphur.

A primary object of the invention is to provide a process for pelletising sulphur that is simple and cheap and which gives externally hard pellets suitable for transportation by, for example, pneumatic handling equipment.

According to the present invention, sulphur or like material is pelletised by being delivered, in the molten condition, into a body of water at substantially atmospheric pressure, and means are provided to keep the resulting globules or droplets of sulphur moving in the water and to prevent them massing or piling up together until in the course of solidifying they have reached a condition, at least externally, in which they do not adhere to one another.

Previous proposals have been made for pelletising sulphur an essential feature of which has been the treatment of the sulphur in hot water under pressure. Since the boiling point of water at atmospheric pressure is below the melting point of sulphur, a pressure above atmospheric has been thought necessary to enable the melting point of sulphur to be reached. By contrast, the technique of this invention affords a process for pelletizing sulphur that is simpler and cheaper than the processes previously proposed, especially in that it does not require operation under pressure.

Another feature of some previous proposals has been the provision of a tall tower, say 40 feet high, through which the droplets of molten feed material could fall while solidifying into pellets. Such a tall tower is a costly piece of equipment to install and maintain. According to a preferred feature of the present invention, an agitation or swirl is created in the body of water in which the pelletization takes place. This, together with the fact that colder water can be used, enables pellets to be obtained without the need for a tall tower or pressurised cooling column.

We have also found that a still further improvement is obtained if one or more of a certain class of surface active agents are added to the water. In the preferred method, the added agents are silicones. An important result of using such agents is that the solidifying globules can be allowed to come together at a considerably higher temperature without risk of the pellets adhering to one another. As a consequence there is a saving in equipment, in the particular plant for drying the product.

Methods of carrying the invention into practice will now be described by way of example and with reference to the accompanying drawings, in which:

FIGURE 1 is a diagrammatic elevation of a sulphur pelletizing plant, and

FIGURE 2 illustrates a possible modification of that plant.

Referring to FIGURE 1 of the drawings, a molten sulphur feed, for example at about 160 degrees C. at which temperature the sulphur becomes quite free flowing, is delivered to a molten sulphur reservoir 11 at the top of a pelletizing vessel 12 of short columnar form. The floor of the reservoir 11 is formed by a plate 13 in which are fitted a large number of nozzles 14, say 1½ to 2 mms. in diameter, which deliver the molten sulphur downwardly beneath the plate 13 in separate streams. Some distance beneath the nozzle plate 13 but still fairly near the top of the vessel 12 is an impeller disc 15 which is rotated by a vertical shaft 16. The vessel 12 is filled with water to a level well above the disc 15 but a few inches, say 2" to 4", below the nozzle plate 13, and the disc 15 creates a swirl in the body of water.

The molten sulphur streams from the nozzles 14, after a short fall vertically through atmospheric air, break up into globules or droplets upon entering the water and are caught up in the swirl created by the rotation of the impeller disc 15 and caused to follow a path which is more or less spiral as they drop through the vessel. At its lower end the vessel 12, which may be, say, about three feet high, has a coned bottom 18 in which the sulphur bodies, now solidified into pellets, collect and from where they are withdrawn through a trap 17. A screen 19 dewaters the pellets and delivers them in a substantially dry condition, while the extracted water is returned to the vessel 12 via a line 20.

The vessel 12 is operated at atmospheric pressure. The water will, of course, heat up due to the molten sulphur entering it and therefore circulation is maintained to remove the hotter water at the top and replenish lower down with cold. Some of the entering water can be introduced by way of tangential entries 21 at various places in the side wall of the vessel 12 so as to further promote the swirling in the vessel. A heater may be provided around the upper portion of the vessel for controlling the water temperature in this region.

The speed of rotation of the impeller disc should be high enough to prevent any deposit of sulphur on the impeller. The strong agitation in the form of a swirl directly over the impeller disc and the radial discharge at the periphery of the disc has the effect of breaking up the sulphur droplets to a smaller size whereas droplets falling outside the main swirl near the vessel wall will not be subjected to such a strong action and therefore remain larger. It is, in general, desirable to obtain a product in which the pellets vary in size, as closing packing then occurs to give a high bulk density. It is, however, undesirable that sulphur droplets should be permitted to fall into the comparatively calm centre or "eye" of the swirl.

To prevent a funnel of air in the swirl vortex from interfering with the satisfactory production of pellets, a barrier element can be mounted above the impeller to check the downward extent of this funnel. The barrier element may be mounted on the impeller shaft to rotate therewith, as at 22, or it may be a fixed element carried, for example, from the wall of the vessel. The interior of the pellets produced appears to be rhombic crystal sulphur while the crust is amorphous. The amorphous crust is hard, smooth and rounded and makes the pellets particularly suitable for handling by, for example, pneumatic means.

The impeller disc can be dished or flat. And various configurations of blades may be empolyed thereon. The exact design of the impeller, and its speed, depth of immersion and clearance from the vessel side wall are chosen to suit the circumstances of each particular plant and the nature of the product desired. By raising and lowering the impeller it is possible to vary the size of the pellets produced. Especially good control of pellet size can be achieved by the use of a skirt 23 (FIGURE 2) around the impeller which has four internal deflector humps 24 of smooth arcuate form disposed equidistantly around its periphery. To form these humps the skirt 23 has four part-cylindrical concavities 25 at 90 degrees intervals.

The skirt 23 with its concavities should preferably extend from above the water level in the vessel to some distance below the level at which the impeller normally operates. It is convenient to use the four passages formed between the humps 24 and the wall of the vessel 12 as off-takes for water flowing upwardly in the vessel and there may, if desired, be mesh or gauze material, e.g. 60 mesh gauze across the bottom ends of these passages to prevent carrying of sulphur pellets into the overflow. At their upper ends the four passages may communicate with an annular overflow channel.

If the impeller is progressively lowered from within the skirt to a level below it the pellet size will increase, and therefore we have a simple and inexpensive way of making a pelletizing vessel that can be readily adjusted, without dismantling or the addition or removal of parts, to produce pellets of varying sizes according to the purpose for which they are required.

Since the pellets constituting the product are required for use in a dry state, it is advantageous if they leave the vessel 12 at a reasonably elevated temperature to assist natural drying. We have discovered that certain additives to the water in the vessel are especially valuable in this connection. In particular, silicone fluid polymers may be used to advantage.

There are many silicone fluid additives that give beneficial results, but in general those of higher viscosity are preferred, such a viscosity of 30,000 centistokes at 25 degrees C., if operation at the more elevated temperatures is required. The lower viscosity silicones tend to lose their efficacy with rise in temperature, and a viscosity range of 30,000 to 100,000 centistokes is preferred. Many silicone fluids require dilution in a solvent, for example, benzene, toluene or zylene, before they will disperse in the water body to the best extent.

It will be understood that liquid silicones with sufficient chain length and heat stability are employed, such as dimethyl silicones and phenyl substituted polysiloxanes. It is necessary to choose a silicone fluid which does not react chemically with the material being pelletized.

As to the amount to be added this can readily be determined for each silicone by simple experiment; too little does not give the required result and too much either shows no significant improvement over the correct amount or in some cases results in the sulphur joining up into thread of string-like formations. A few drops per gallon of water is ordinarily all that is required.

The additive promotes the dispersion of the molten sulphur as globules, stimulates heat loss from the globules to the water and counteracts any tendency the solidifying globules may have to stick together or to the walls or bottom of the vessel.

Before the globules have travelled down any substantial distance through the water it is possible to collect them while they are still fairly soft and they will not stick together or to the walls of the collector. They can, in appropriate cases, be collected while still at a temperature as high as 56 degrees C. This means that the temperature of the water where the sulphur stream is entering may be much nearer that of the sulphur itself, say 80 to 85 degrees C., thus reducing thermal shock, without increasing the amount of cooling equipment needed. The temperature of the water entering at the bottom of the column will then be about 50 degrees C.

Of course, it is not necessary to remove the pellets at elevated temperature. If the pelletizing plant is arranged to cool down the pellets to near ambient temperature they will be quite hard and resilient when collected and ready almost immediately for mechanical handling; they will harden still further and lose their resilience on storing. Furthermore, the swirling action still has the substantial advantage of producing pellets without significant perforations, by creating a kneading or rolling action on the pellets, even if by reason of the additive it is not necessary for the purpose of preventing the solidifying pellets from sticking together or to the vessel.

Certain previous proposals for the pelletizing of sulphur have resulted in the formation of pellets with hollow centres or a weakening "tunnel" hole therein due to free vertical fall of the droplets in water. The present technique helps to reduce the size of this hole; in particular, the motion of the vortex has this desirable effect. Under favourable circumstances the hole can be reduced to a mere dent.

While silicones are the preferred additives, certain other polymeric materials have been found effective, particularly water soluble compounds. Thus polyethylene and polypropylene oxide compounds, polyacrylamides and polysulphites are effective to varying degrees. These materials have a limited temperature range of use but this can be raised if they are employed in conjunction with silicones.

With regard to the plant, it is beneficial in certain cases to slant the sulphur injection nozzles but the amount and whether it is with or against the flow depends on the particular additive used. Consequently, it may be advantageous to fit swivel nozzles to allow for use of different additives.

A little pressure will ordinarily be desired to feed the sulphur through the nozzles, say 1 p.s.i.g. for 2 mm. size nozzles.

Many modifications are possible without departing from the scope of the invention. Other forms of stirrers are possible, and mechanical stirring can be dispensed with if the agitation or swirl is produced entirely by means of tangential water jets disposed at intervals around, and up the height of, the vessel.

The method described enables sulphur pellets to be produced with a moisture content of less than 1% by weight, which we believe has not been possible previously because of moisture locked inside the pellets. Test results on samples of product obtained gave moisture contents, after drying, of the order of 0.02% by weight. Also the pellets are hard and tough and well suited to pneumatic handling techniques.

What is claimed is:

1. A method of pelletizing sulphur wherein the sulphur in a molten condition is delivered downwardly from a reservoir to a body of water which is at substantially atmospheric pressure and is maintained in a state of agitation whereby the sulphur is separated into discrete globules on entering the water and descend out of contact with one another in a swirling shower, being sufficiently solidified to no longer adhere to one another before reaching the bottom of the water where they are removed through a trap.

2. A method according to claim 1 wherein the agitation in the body of water is created at least in part by rotation of an impeller therein.

3. A method according to claim 1, wherein the agitation in the body of water is created at least in part by water jets entering substantially tangentially at the sides of the body.

4. A method according to claim 2, wherein the agitation in the body of water is created in an upper region thereof by rotation of an impeller and in a lower region by water jets entering substantially tangentially at the sides of the body.

5. A method according to claim 1, wherein water is continuously circulated through the body to remove the heat gained from the solidifying sulphur globules.

6. A method according to claim 5, wherein the water circulation produces an upward flow in the body, in addition to the agitation.

7. A method according to claim 1, wherein a silicone fluid is added to the body of water as a surface active agent.

8. A method according to claim 7, wherein the silicone fluid is a dimethyl silicone with a viscosity in the region of 30,000 centistokes.

9. A method according to claim 1, wherein there is added to the body of water as a surface active agent a water soluble polymeric material chosen from the class comprising polyethylene and polypropylene oxide compounds, polyacrylamides and polysulphites.

References Cited

UNITED STATES PATENTS

| | | | |
|---|---|---|---|
| 1,306,060 | 6/1919 | Hall | 264—14 |
| 1,782,038 | 11/1930 | Haak | 264—14 |
| 2,652,386 | 9/1953 | Wallman | 264—14 |
| 3,334,159 | 8/1967 | Campbell | 264—13 |

ROBERT F. WHITE, Primary Examiner

J. R. HALL, Assistant Examiner

U.S. Cl. X.R.

264—14